US008797326B2

(12) United States Patent
Yanagawa

(10) Patent No.: US 8,797,326 B2
(45) Date of Patent: Aug. 5, 2014

(54) DISPLAY CONTROL APPARATUS

(75) Inventor: Takahiro Yanagawa, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/174,819

(22) Filed: Jul. 1, 2011

(65) Prior Publication Data

US 2011/0264674 A1 Oct. 27, 2011

Related U.S. Application Data

(62) Division of application No. 12/125,049, filed on May 21, 2008, now Pat. No. 8,212,819.

(30) Foreign Application Priority Data

May 22, 2007 (JP) ................................ 2007-135331
May 22, 2007 (JP) ................................ 2007-135332

(51) Int. Cl.
*G06T 11/00* (2006.01)
*G06F 12/00* (2006.01)
*G06F 17/30* (2006.01)

(52) U.S. Cl.
USPC .......... 345/467; 707/821; 707/822; 707/828; 707/829; 707/830

(58) Field of Classification Search
USPC ................................. 707/821-899; 345/467
See application file for complete search history.

(56) References Cited

U.S. PATENT DOCUMENTS

| | | | | |
|---|---|---|---|---|
| 5,745,902 | A | 4/1998 | Miller et al. | |
| 6,249,782 | B1 | 6/2001 | Day et al. | |
| 7,212,469 | B2 | 5/2007 | Hirade et al. | |
| 7,685,531 | B2 * | 3/2010 | Yeung et al. | 715/769 |
| 2003/0142953 | A1 * | 7/2003 | Terada et al. | 386/46 |
| 2005/0246663 | A1 * | 11/2005 | Yeung et al. | 715/851 |
| 2005/0246716 | A1 * | 11/2005 | Smith et al. | 719/315 |
| 2006/0031893 | A1 | 2/2006 | Fang et al. | |
| 2006/0123357 | A1 | 6/2006 | Okamura | |
| 2006/0171682 | A1 | 8/2006 | Komano et al. | |

FOREIGN PATENT DOCUMENTS

| | | | |
|---|---|---|---|
| JP | 2004-157260 | A | 6/2004 |
| JP | 2006-196058 | A | 7/2006 |
| JP | 2006350944 | A | 12/2006 |
| JP | 2007232920 | A | 9/2007 |

OTHER PUBLICATIONS

Japanese Office Action issued in corresponding JP2007-135331 dated Jul. 31, 2012. English translation provided.

* cited by examiner

*Primary Examiner* — Ke Xiao
*Assistant Examiner* — Jed-Justin Imperial
(74) *Attorney, Agent, or Firm* — Rossi, Kimms & McDowell LLP

(57) ABSTRACT

When a list of file names is to be displayed on a display device, a comparison is made between a necessary display width of each of the file names and a width of a display area of the display device. For each of the file names having a necessary display width greater than the width of the display area, it is checked whether the file name contains a particular character string portion of a predetermined type, and, if so, the file name is displayed in the list in a partly-omitted display style where a leading end portion, particular character string portion and extension of the file name are left in the list with the other part of the character string omitted. The particular character string portion can function as an important element for identifying the data item in question.

9 Claims, 4 Drawing Sheets

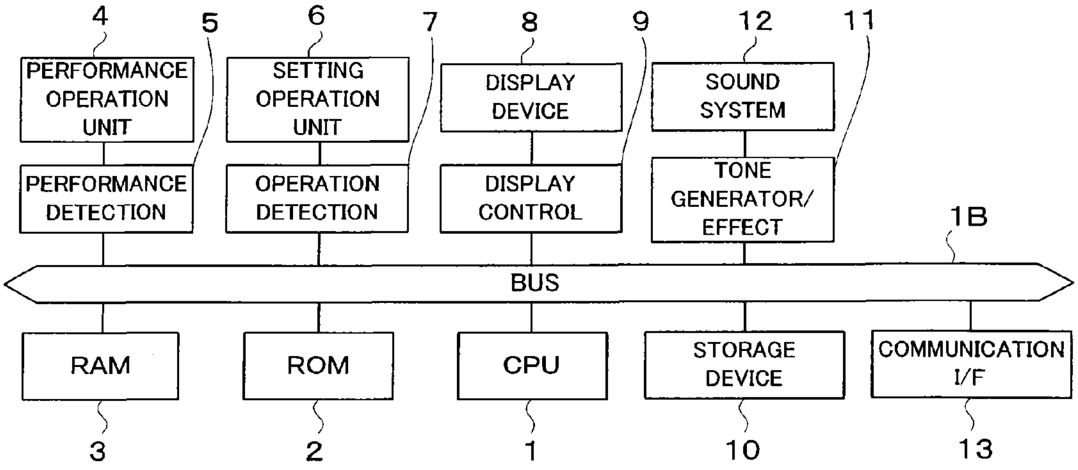
FIG. 1
「!」+「song」+「nnn」
FIG. 2A
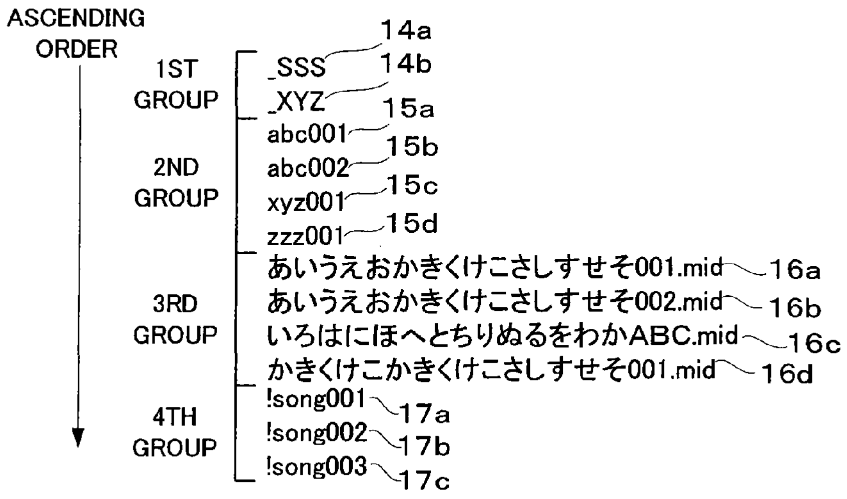
FIG. 2B

DISPLAY CONTROL APPARATUS

CROSS REFERENCE TO RELATED APPLICATION

This is a divisional of and claims priority from U.S. patent application Ser. No. 12/125,049 filed May 21, 2008, the content of which is incorporated herein by reference.

BACKGROUND

The present invention relates generally to display control apparatus for causing a display device to display character string information, and more particularly to display control to be performed in displaying a list of names of data files of music piece data sets on an electronic music apparatus, such as an electronic musical instrument.

The present invention also relates to file or folder management apparatus equipped with a function for automatically assigning a name to a file or folder to be newly created, and more particularly to an automatic file name assigning function to be performed in creating a data file of music piece data in an electronic music apparatus, such as an electronic musical instrument.

Heretofore, there have been known electronic music apparatus, such as electronic musical instruments, which are equipped with a display device for displaying various pieces of information. In many cases, the display device is provided on the upper surface of a panel of the apparatus body and has a relatively small screen size. Thus, a display area capable of displaying various information on the display device is limited to a relatively small range. Therefore, when character strings indicative of file names, music piece names (or titles), accompaniment style names, tone color names, etc. are to be displayed on the display device, and if the entire character string can not be displayed because the length (or necessary display width) of the character string is larger than the limited display area, it has been conventional to delete or omit part of the character string to display the remaining part of the character string.

For example, some of the conventionally-known electronic music apparatus, capable of reproducing music data sets in predetermined order of a playlist that defines reproducing order of a plurality of music pieces, are arranged to cause a display device to display the playlist including character strings indicative of names or titles of music piece data sets registered in the playlist and paths of the individual music piece data sets (i.e., character string indicative of respective storage locations of the files of the music piece data sets). In this list, a region for displaying the paths is limited to a narrow display area so that the whole of the path-indicating character string can not be displayed, and thus, it has been conventional to omit a character string portion at a leading end portion of the path and display only a predetermined number of characters from the trailing end of the path (see Japanese Patent Application Laid-open Publication No. 2006-196058, which will hereinafter be referred to as Patent Literature 1).

However, in the case where the partly-omitted display style with only the predetermined number of characters from the trailing end of the character string as disclosed in Patent Literature 1 is employed, and if a character string portion necessary for data identification is included in the omitted leading-end character string portion, there may arise the possibility that it is difficult to distinguish between and identify individual data from the displayed character string portion. It has also been conventional to omit a character string portion of the trailing end portion of the path and display only a predetermined number of characters from the leading end of the path; in this case too, if a character string portion necessary for data identification is included in the omitted trailing-end character string portion, there may arise the possibility that it is difficult to distinguish between and identify individual data from the displayed character string portion. Namely, whether the character string portion necessary for data identification should be on the leading end side or on the trailing end side depends on the case, and thus, with the partly-omitted display style where a leading-end character string portion or trailing-end character string portion is displayed with the other part omitted from the list as in the conventionally-known technique, there would arise the inconvenience that it is difficult to distinguish between and identify individual data on the basis of the character strings indicated in the playlist.

Further, in the field of electronic music apparatus, such as electronic musical instruments, there have been known techniques where a predetermined system automatically assigns a name to a file to be newly created. In an apparatus disclosed in Japanese Patent Application Laid-open Publication No. 2004-157260 (hereinafter referred to as Patent Literature 2), for example, a file name comprising a predetermined letter string (e.g., "Song") and number "n" is automatically assigned to a file to be newly created at the time of audio data recording. Then, once other audio data are recorded overlappingly (i.e., overdubbed) onto the file having the automatically assigned name, a backup file of the original file is automatically created, and another file name is created by adding another predetermined letter string "Bn" to the end of the original file name. Here, the number "n" included in the files is a positive integer number, and a file name having a number indicative of file creation order ("Song1", "Song2", . . . ) is automatically created each time an audio data set is newly recorded, and a file name ("Song1_B1", "Song2_B2", . . . ) having a number indicative of backup generation order is automatically assigned to the backup file of file name "Song1". Such a naming scheme is advantageous in that putting the word "song" in a character string portion of each automatically assigned file name can indicate that the file has data pertaining to a music piece, and in that the creation order and backup generation order of each file can be known intuitively from the number portion.

Typically, when newly creating a file, an electronic music apparatus of the aforementioned type follows an operational sequence as briefed below. First, in response to a new file creation instruction, an empty file automatically assigned a file name is created, and then data (audio data, MIDI performance data or the like) to be recorded are written into the empty file. Then, if necessary, the user can change the automatically assigned name of the file, having the audio data written therein, to another desired name. Namely, according to such an operational sequence, the newly created file is temporarily stored under the automatically assigned name.

The newly created file is stored into a storage medium provided in the electronic music apparatus. When a specific file is to be read out from among a plurality of files stored in the storage medium, it is common to display a list of all of the stored files on a display device and prompt the user to find the specific or desired file from the displayed list. In the list, the individual files are sorted by file name (or in order of the file names), so that the user can find a desired file in accordance with the order in which the files are sorted (or arranged). The sorting order of the files follows a predetermined sort rule that defines order relationship among a multiplicity of characters (alphabetical letters, Japanese syllabary characters (Kana), Chinese characters, numerals, marks, etc.) usable as file names. The sort rule defines the order relationship, for example, in accordance with the alphabetical order, order of Japanese syllabary, small-large relationship among the numerals or the like.

Further, in the displayed list, the files are arranged, in the sorting order according to the predetermined rule, without the files with the automatically assigned names and the files with the user-assigned names being discriminated from each other. Furthermore, the conventional automatic name assigning function does not create file names taking the sorting order into account. Therefore, as the quantity of the files stored in the apparatus becomes great, a newly created file (having an automatically assigned file name) would be buried in the great quantity of the files so that it may become difficult to find where in the list the newly created file is located. Namely, the conventionally-known technique would present the inconvenience that, as the quantity of files stored in the apparatus becomes great, it tends to be difficult to find a newly created file.

SUMMARY OF THE INVENTION

In view of the foregoing, it is a first object of the present invention to provide an improved display control apparatus which allows part of a character string display to be omitted in such a style that still can reliably display a character string portion necessary for identification of data contained in the character string.

It is a second object of the present invention to provide an improved file or folder management apparatus which permits facilitated identification of a file or folder having a name automatically assigned through an automatic name assigning function.

According to a first aspect of the present invention, there is provided an improved display control apparatus, which comprises: a storage section that stores a plurality of data items; a display device that has a display area of a predetermined width for displaying character strings identifying individual ones of the plurality of data items stored in the storage section; a comparison section that compares a necessary display width of each of the character strings and the width of the display area of the display device; a determination section that determines, for each of the character strings having been judged as having a necessary display width greater than the width of the display area of the display device as a result of comparison by the comparison section, whether or not the character string contains a particular character string portion of a predetermined type; and a display control section that causes the display device to display a list of the character strings identifying the individual data items stored in the storage section, and that, for each of the character strings having been determined by the determination section as containing the particular character string portion, performs control to display the character string in the list in a display style where the particular character string portion is left in the list with the other part of the character string omitted from the list.

In the display control apparatus thus constructed, when the list of file names identifying the individual data items is to be displayed on the display device, a comparison is made between the necessary display width of each of the file names and the width of the display area (i.e., displayable width) of the display device. For each of the file names having a necessary display width greater than the width of the display area, the determination section determines whether the file name contains the particular character string portion of the predetermined type, and, if so, the file name is displayed in the list in the partly-omitted display style where the particular character string portion of the file name is left in the list with the other part of the character string omitted from the list. The particular character string portion may be a character string that can function as an important element for identifying the data item in question or distinguishing the data item in question from the other data items. In this specification, the term "data item" is used to mean a set of data that can be represented as one item (one name) in the list, such as music piece data (e.g., MIDI performance data) indicative of a music piece, accompaniment style data to be used for an automatic accompaniment function of an electronic musical instrument or tone color data indicative of a tone color of a tone to be generated by the electronic musical instrument.

In the display control apparatus according to the first aspect of the present invention, when the display control section is to be displayed in the list in the display style where the particular character string portion is left in the list with the other part of the character string omitted from the list, the display control section may further perform control to cause the display device to display the character string in a display style where a leading end portion and trailing end portion of the character string are left in the list with the other part of the character string omitted from the list.

Because, when the list of file names identifying the individual data items is to be displayed on the display device and if any of the character strings, having been judged as having a necessary display width greater than the width of the display area of the display device, contains a particular character string portion of the predetermined type, the character string is displayed in the list in the display style where the particular character string portion is left in the list with the other part of the character string omitted from the list, the particular character string portion can be reliably displayed in the list. Thus, if a character string that can function as an important element for identifying the data item in question is set as the particular character string portion, there can be achieved the superior benefit that a user of the display control apparatus can reliably distinguish between and identify the individual data items on the basis of the character strings in the list.

According to a second aspect of the present invention, there is provided an improved file or folder management apparatus, which comprises: a storage section that stores one or more files for storing data sets and one or more folders for collectively holding the files, each of the files and folders having a unique name assigned thereto; a sort section that sorts the files or folders, stored in the storage section, in predetermined order of the names of the files or folders in accordance with a sort rule defining order relationship among all characters usable as the names of the files and folders; a creation section that newly creates a file or folder in the storage section; and a name assigning section that automatically assigns a name, having a character defined at the leading or trailing end of the order relationship of all characters usable as the names of the files and folders in accordance with the sort rule, to the file or folder newly created by the creation section.

In the file or folder management apparatus of the present invention, the creation section newly creates a file or folder in the storage section, and the name assigning section automatically assigns a name, having a particular character defined at the leading or trailing end of the order relationship of all characters usable as the names of the files and folders in accordance with the sort rule, to the file or folder newly created by the creation section. Thus, when the files or folders have been sorted by file name (i.e., in the predetermined order of the file names or folder names), the newly created file or folder is located at the leading or trailing end of the sorting order.

By thus assigning a newly created file or folder a name having the particular character defined at the leading or trailing end of order relationship in accordance with the sort rule that defines the order relationship of all characters usable as names of files and folders, each newly created file or folder is located at the leading or trailing end of the sorting order when the files or folders have been sorted by file name. Thus, the file or folder having a file name or folder name automatically assigned by the name assigning section can be clearly distinguished from the other file names or folder names. Therefore, even where a multiplicity of files or folders are stored in the storage section, the present invention achieves the superior benefit that each newly created file or folder, i.e. file or folder having a file name or folder name automatically assigned by the name assigning section, can be readily found from among the multiplicity of files or folders.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 1 is a block diagram showing an example electric hardware setup of an electronic music apparatus to which is applied a file or folder management apparatus according to an embodiment of the present invention;

FIG. 2A is a diagram explanatory of example constructions of file names to be automatically assigned in the electronic music apparatus of FIG. 1;

FIG. 2B is a diagram explanatory of a sort rule employed in the electronic music apparatus of FIG. 1;

DETAILED DESCRIPTION

Figure 3:
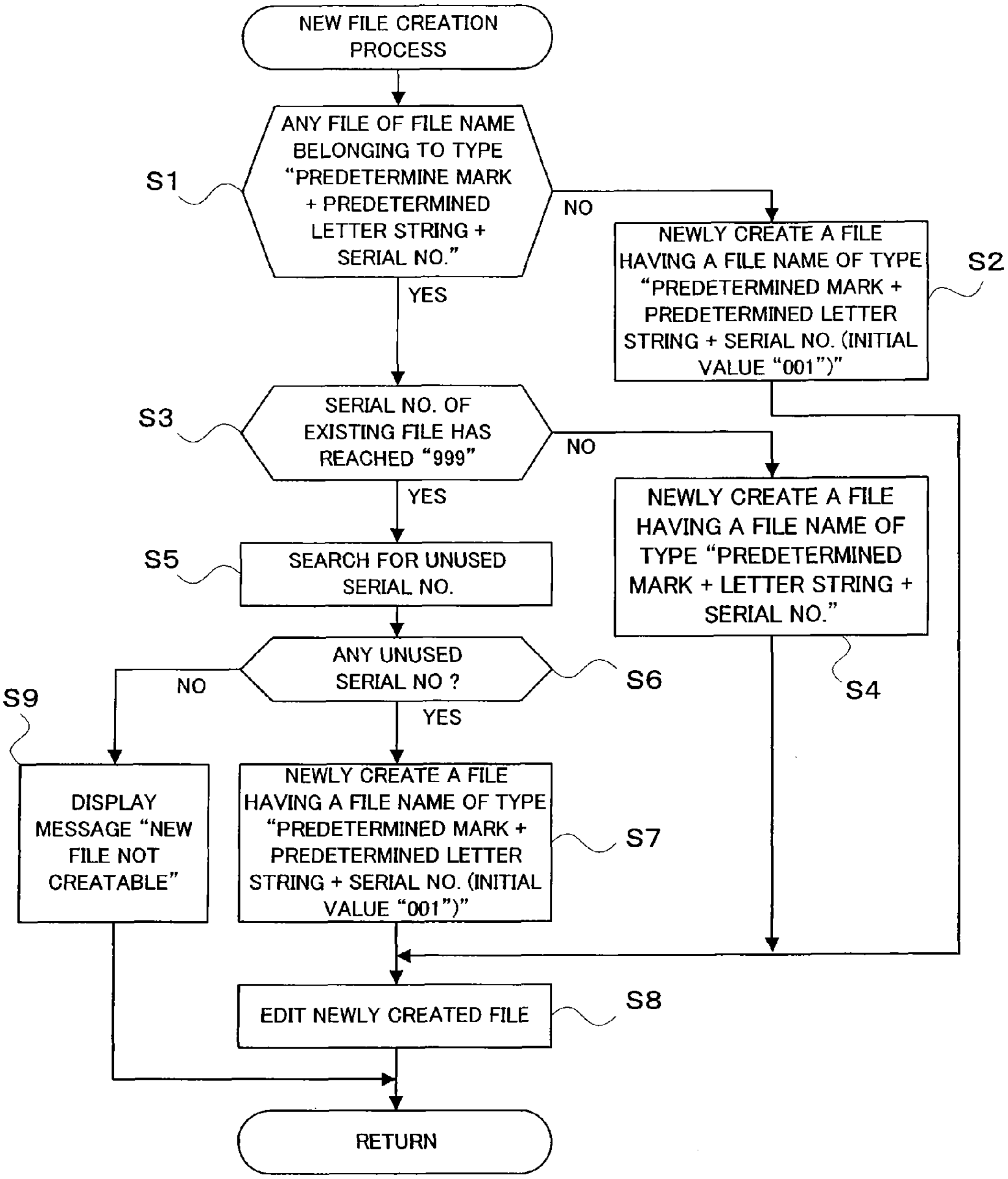
FIG. 3 is a flow chart showing an example operational sequence of a new file creation process performed in the electronic music apparatus of FIG. 1.

FIG. 1 is a block diagram showing an example electric hardware setup of an electronic music apparatus to which is applied a file or folder management apparatus according to an embodiment of the present invention. The electronic music apparatus may be in the form of an electronic musical instrument, such as an electronic organ, electronic piano or synthesizer.

As shown in FIG. 1, the electronic music apparatus includes: a microcomputer comprising a CPU 1, ROM 2 and RAM 3; a performance operation (or operator) unit 4 operable by a human operator to perform performance input operation (i.e., tone generation instructing operation); a performance detection circuit 5 for detecting each performance input operation performed by the human operator via the performance operation unit 4; a setting operation (or operator) unit 6 operable by the human operator to perform various setting operation; a setting operation detection circuit 7 for detecting setting operation performed via the setting operation unit 6; a display device 8 for displaying various information; a display control circuit 9 for controlling the display on the display device 8; a tone generator section 11 for electronically generating a tone signal; a sound system 12 for sounding the tone signal generated by the tone generator section 11; and a communication interface 13. The above-mentioned components are interconnected via a data and address bus 1B.

Figure 5:
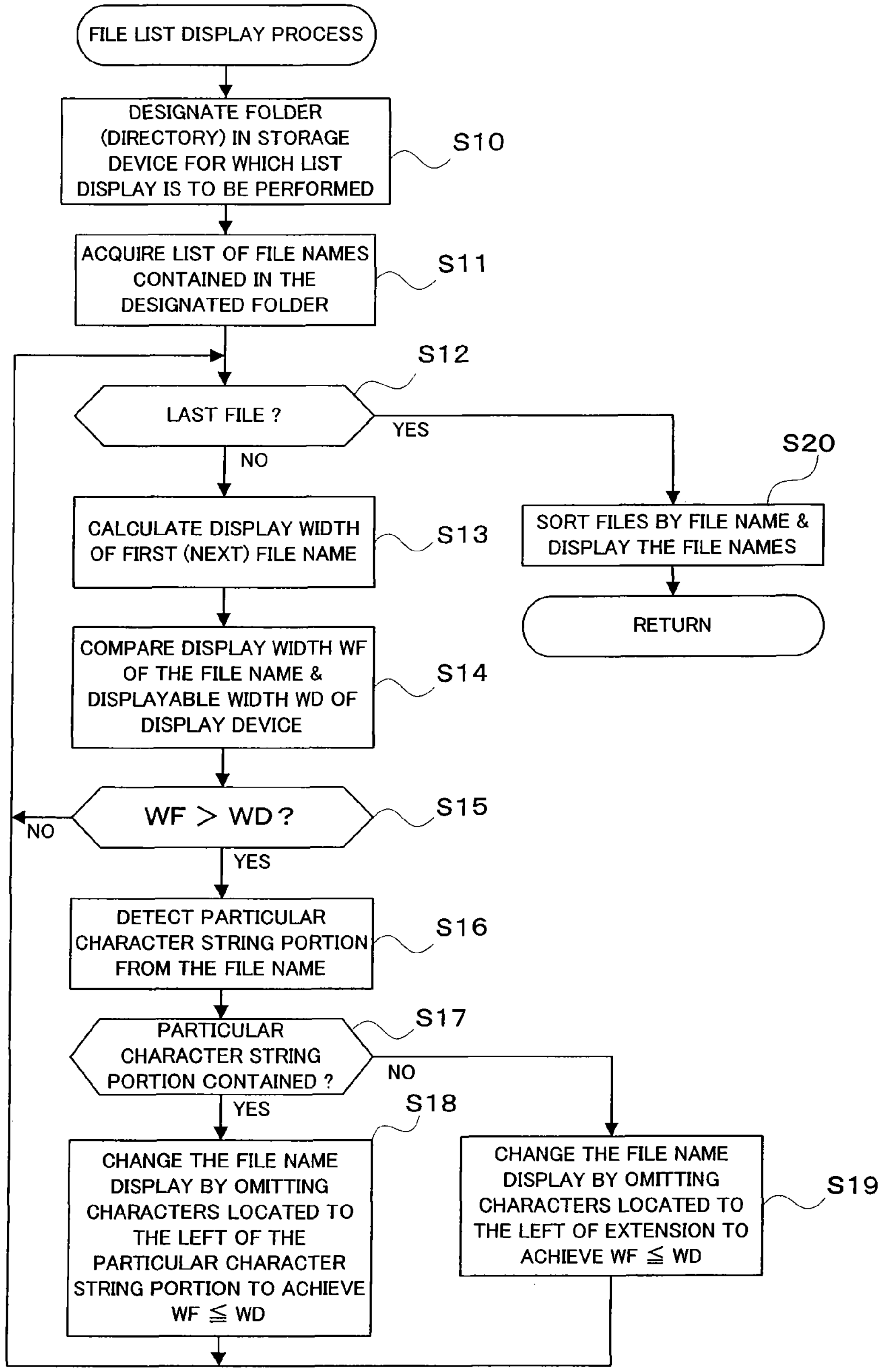
FIG. 5 is a flow chart showing an example operational sequence of a file name list display process performed in the electronic music apparatus of FIG. 1.

The CPU 1 executes control programs stored in the ROM 2 or RAM 3, to control all operations of the electronic music apparatus. In the instant embodiment, a new file creation process of FIG. 3 and file list display process of FIG. 5 are constructed and implemented by the control programs executed by the CPU 1.

The performance operation unit 4 may be of any desired type as long as it can be used by the human operator or user to perform music performance operation; for example, the performance operation unit 4 may be a keyboard having a plurality of keys assigned different tone pitches. Using the performance operation unit 4 to perform music performance operation, the user can cause the sound system 12 to audibly generate tones corresponding to the performance operation and cause the contents of the performance operation to be stored into the storage device 10 as a file of music piece data pertaining to a music piece. The setting operation unit 6 comprises switches provided on a panel of the body of the electronic music apparatus, which includes switches for selecting parameters of tone colors and the like, various functions, etc. and operation members for operating GUI components on the display device 8.

The display device 8 comprises, for example, a liquid crystal display (LCD) panel disposed on the panel of the body of the electronic music apparatus. Various control screens are displayed on the display device 8, and various GUI components (such as images of operation members) that receive various operation from the user and various pieces of character information are shown on each of the control screens. Operation or manipulation of the GUI components shown on the display device 8 may be executed by the user using the setting operation unit 6. Alternatively, the display device 8 may be of a touch panel type that includes a mechanism for the user to perform input operation by touching any of displayed items on the screen. As will be later described in more detail, the display device 8 is used to display a list of file names. Note that, because the display device 8 is provided on the panel of the body of the electronic music apparatus, it is required to minimize the screen size of the display device 8; namely, the area capable of displaying information on the display device 8 is physically limited.

The storage device 10 comprises, for example, a combination of a conventional storage medium of a desired type, such as a hard disk, FD (Flexible Disk or Floppy Disk (trademark)), CD (Compact Disk), DVD (Digital Versatile Disk) or semiconductor memory like a flash memory, and a drive device for the storage device. The storage medium may be detachably attached to the body of the electronic music apparatus or provided within the body of the electronic music apparatus.

In the storage device 10 are stored files containing music piece data sets of a plurality of music pieces. The storage device 10 corresponds to a storage section in the appended claims, and the data file of a music piece corresponds to a "data item" in the appended claims. The music piece data set of a music piece is, for example, a set of performance data of a suitable format, such as MIDI performance data. The user can have a plurality of files, stored in the storage device 10, held in a folder (directory) in a suitably classified form. A plurality of such folders can be created within the storage device 10, and unique names are assigned to individual files and folders within the storage device 10; more specifically, unique names each comprising a desired character string may be assigned by the user to the individual files and folders, or unique names each comprising a predetermined character string may be assigned through a later-described automatic name assigning function. Further, as well known, the user can perform operation for, for example, newly creating a file or folder, moving a stored location of a file or folder, copying or deleting a file or folder.

The tone generator section 11 includes a tone generator circuit for generating a tone signal, and an effect impartment circuit for imparting an effect to the tone signal generated by the tone generator circuit. More specifically, the tone generator section 11 generates a tone signal on the basis of performance input operation executed by the user via the performance operation unit 4 or on the basis of performance data (MIDI performance data) generated through reproduction, by a sequencer, of the music piece data stored in the storage device 10. Each tone signal generated by the tone generator section 11 is audibly reproduced or sounded by the sound system including an amplifier and speaker.

Further, the electronic music apparatus of FIG. 1 may be equipped with the communication interface (I/F) 13 for communicating data with external equipment. The communication I/F 13 may be one or more of a music-only wired I/F, such as a MIDI interface, for communicating MIDI data with external MIDI equipment, general-purpose, short-range wired I/F, such as a USB or IEEE1394, general-purpose network I/F, such as Ethernet (trademark), and general-purpose, short-range wireless I/F, such as wireless LAN or Bluetooth (trademark). The electronic music apparatus of FIG. 1 is also connectable with an external storage device (such as a USB memory) via the communication I/F 13 to store a file into the external storage device and read out a file stored in the external storage device.

The electronic music apparatus of FIG. 1 further has a function that automatically assigns a file name, comprising a predetermined character string, to a file that is to be newly created for storage into the storage device 10. Such a function for automatically assigning a file name to a file to be newly created has heretofore been known. As will be later detailed, a significant characteristic feature of the present invention resides in a novel way of determining a file name to be automatically assigned through the automatic name assigning function. Details of the new file creation process will be discussed later with reference to FIG. 3.

In the instant embodiment, a file name to be automatically assigned to a new file through the automatic name assigning function comprises a character string which has a predetermined mark "!" at its leading end, a letter string "song" immediately following the mark "!" and a three-digit numeral string "nnn" at its trailing end, as shown in FIG. 2A. Here, "n" indicates a positive integer, and the exclamation mark "!" at the leading end of the file name is a character defined at the trailing end of order relationship (ascending sorting order) of all characters usable as names of files and folders in accordance with a predetermined sort rule. Thus, the file name comprising the leading-end mark "!", letter string "song" and three-digit numeral string "nnn" is located at the end of a string of file names having been sorted in the ascending order of the file names in accordance with the predetermined sort rule.

FIG. 2B is a diagram explanatory of the sort rule employed in the instant embodiment, which shows a group of file names sorted by file name (i.e., in the predetermined order of the file names) in accordance with the predetermined sort rule. Character strings indicated by reference numerals 14-17 in FIG. 2B are the file names that are sorted (arranged) in the ascending order. Function for sorting, by file name (or in the predetermined order of the file names), the files (or folders) stored in the storage device 10 is provided as one of functions for controlling the storage device 10 in accordance with the control programs executed by the CPU 1, and such a sorting function itself has been known in the art. The sort rule in accordance with which to perform the sorting function is a rule that defines, in order to sort (arrange) file names of files within a single folder, order relationship among characters (alphabetical letters, Japanese syllabary characters (Kana), Chinese characters, numerals, marks, etc.) usable as file names. For example, in the electronic music apparatus of FIG. 1, a table describing the sort rule is stored in the ROM 2, and a sorting process according to the sort rule is performed with reference to the table. Here, the sorting in the "ascending order" means that the file names are arranged in predetermined order from a high-rank character to a low-rank character defined in accordance with the sort rule, e.g. in order from a small value (1) to a great value in the case of numerals, in "あ"-to-"ん" order in the case of the 50-character Japanese syllabary or in "A"-to-"Z" order in the case of alphabetical letters. Conversely, arranging the file names in predetermined order from a low-rank character to a high-rank character defined in accordance with the sort rule will be referred to as sorting in the "descending order".

According to the sot rule employed in the instant embodiment, as shown in FIG. 2B, the file names are broadly classified, in accordance with the respective leading characters of the file names, into four groups: first group of the file names 14*a* and 14*b*; second group of the file names 15*a*-15*d*; third group of the file names 16*a*-16*d*; and fourth group of the file names 17*a*-17*c*. Here, the first group is a highest-rank group in the sorting order, and the second, third and fourth groups sequentially follow the first group in the ascending order.

The first group includes the file names 14*a* and 14*b* each beginning with a mark that belongs to a half-width (size) mark group of a predetermined first type. The half-width (size) mark group of the predetermined first type includes a half-width underscore mark "_", half-width space mark, etc. More specifically, in the illustrated example of FIG. 2B, the file name 14*a* beginning with a half-width underscore mark "_" like "_SSS" belongs to the first group. Further, the second group includes the file names 15*a*-15*d* each beginning with half-width alphameric characters, such as "abc001" or "abc002", and the third group includes the file names 16*a*-16*d* each beginning with full-width characters such as Japanese characters.

The fourth group is the last group in the ascending sorting order, which includes the file names 17*a*-17*c* each beginning with a mark that belongs to a half-width (size) mark group of a predetermined second type including the exclamation mark "!". The exclamation mark "!" is a character defined at the trailing end, in the ascending sorting order, of the fourth group. Thus, if a plurality of file names are sorted in the ascending order in accordance with the sort rule, the file names having the exclamation mark "!" at their leading end are located at the trailing end of a row of the sorted file names. What is most important of the sort rule employed in the instant embodiment is that the exclamation mark "!" is defined at the trailing end in the ascending sorting order. Thus, order relationship of characters usable as other file names may be determined, for example, in accordance with one of definitions of suitable character codes employed in conventional computers.

Thus, when the files stored in the storage device 10 have been sorted by file name in the ascending sorting order, each file name, comprising the exclamation mark "!", letter string "song" and three-digit numeral string "nnn" and automatically assigned through the automatic name assigning function, is necessarily located at the trailing end of the sorted files, as shown in FIG. 2B. Namely, in the sorted state, each file name automatically assigned through the automatic name assigning function is clearly distinguishable from the other files by its location. Thus, the user is allowed to readily find the file name of the newly created file from among a multiplicity of file names.

In FIG. 2B, file names "!song001", "!song002" and "!song003", automatically assigned through the automatic name assigning function, are shown as examples of the file names belonging to the four group. The automatically assigned file names 17*a*-17*c* all have the same or common leading-end exclamation mark "!" and letter string "song", the letter string "song" can indicate that these files have music piece data stored therein, and these files are distinguishable from one another by their respective three-digit numeral strings "001", "002" and "003". Basically, each of the numeral strings is created by adding a value "1" to the value (number) of the numeral string of the last created file. Namely, each time a file is newly created, a file name having a serial number corresponding to the file creation order is assigned to the new file. Thus, if the arranged order of the file names sorted in the ascending order is considered only with respect to the file names 17*a*-17*c* automatically assigned through the automatic name assigning function, the file name 17*c* of the most-recently-created file will be located at the trailing end of the row of the sorted file names. Essentially, each newly created file is added to the trailing end of the row or group of the files sorted in the ascending order. As a consequence, it is easy for the user to find the most-recently-created file from among the sorted files.

The file names having a "three-digital numeral string" are not necessarily limited to those automatically assigned through the automatic name assigning function. Often, such three-digital numeral strings are assigned to file names of music data files of different takes (or different versions) of a same music piece. In the illustrated example of FIG. 2B, if a performance of the music piece of the file name "abc001" 15*a* is recorded as another take, the user will assign another file name "abc002" 15*b* to a file having the other take of the performance recorded therein. In many cases, the leading alphabetical letter string "abc" indicates a music piece name, and the file names having such an alphabetical letter string "abc" can be distinguished from each other by their respective trailing numeral strings. Thus, in such file names, these leading alphabetical letter string and trailing numeral string can function as main elements for distinguishing between the files. The file names 16*a*-16*d* are examples of file names assigned extensions added to the end of their respective character strings. With the extensions added to the end of the character strings, it is possible to identify types (file formats) of the files. Thus, the extensions of the file names too can function as main elements for distinguishing between the files.

FIG. 3 is a flow chart showing an example operational sequence of the new file creation process. Description will now be given about an example process for automatically assigning a file name, through the automatic file name assigning function, when a new file is to be created. This automatic file name creation process is started up, for example, when the user wants to record a manual performance using the manual performance operation unit 4. Namely, a new file is created for storing performance data generated by a manual performance. Recording start instruction may be given, for example, by the user using the setting operation unit 6 on the panel of the body of the electronic music apparatus or GUI objects displayed on the display 8. Prior to the start of the new file creation, one folder is specified as a destination of the file to be newly created.

At step S1, a check is made as to whether the destination folder currently contains any file having a file name that was automatically assigned through the automatic file name assigning function and belongs to a type "predetermined mark+predetermined letter string+serial number". In the instant embodiment, each file name assigned through the automatic file name assigning function comprises the exclamation mark "!", letter string "song" and "three-digit numeral string" (serial number), as noted above. If the destination folder has no file having such an automatically assigned file name belonging to the "predetermined mark+predetermined letter string+serial number" type (NO determination at step S1), a file assigned a file name "!song001", comprising the exclamation mark "!", letter string "song" and initial value of the three-digit numeral string "001", is newly created at step S2.

If, on the other hand, the folder already contains some file having an automatically assigned file name belonging to the "predetermined mark+predetermined letter string+serial number" type (YES determination at step S1), the entire "three-digit numeral string" of the assigned file name is checked to determine whether the numeral string has a maximum value "999" (step S3). If the three-digit numeral string has not yet reached the maximum value "999" (NO determination at step S3), a value "1" is added to the last digit of the exiting numeral string so that the added result is used as a file number of the file to be newly created (step S4). Thus, until the numeric string of the file name, assigned through the automatic file name assigning function, reaches "999", a file name having a serial number corresponding to the file creation order (i.e., "!song'nnn'" like "!song001", "!song002", "!song003", . . . ) is automatically assigned each time a file is newly created.

If the three-digit numeral string of the automatically assigned file name of the file currently existing in the folder has already reached the maximum value "999", all three-digit numeral strings in the folder in question are checked, at step S4, to see whether there is any unused (i.e., currently available) number among three-digit numbers in the range of the initial value "001" to the maximum value "999". Such an unused number occurs if, for example, any of the file names automatically assigned before has been changed by the user to another file name or any of the files has been deleted from the folder by the user. If there is any unused number (YES determination at step S6), this unused number is use as the three-digit numeral string of the file name to be automatically assigned to the file to be newly created (step S7). Thus, even after the numeral string of some automatically assigned file name has reached "999" in the folder, it is possible to assign a file name "!song'nnn'" to the file to be newly created. Let it be assumed here that, if there are two or more unused numbers in the folder, these unused numbers will be sequentially used in ascending order. If, on the other hand, all of the values from the "000" initial value to the "999" are currently being used in the existing three-digit numeral strings and there is no unused one (NO determination at step S6), no unique file name can not be automatically assigned to the file to be newly created, and thus, the operational sequence is brought to an end without creating the new file. At that time, it is preferable that the display device 8 display a message "new file not creatable".

Through the operation at step S2, S4 or S7, a file having a file name, comprising the exclamation mark "!", letter string "song" and three-digit numeral string "nnn" as shown in FIG. 2A, is newly created. At that time, the newly created file is empty i.e. contains no data, and the user can perform desired editing on the newly created file at step S8. In the instant embodiment, the "desired editing" means an operation for writing MIDI performance data, representative of a manual performance executed by the user via the performance operation unit 4, are stored into the newly created file; thus, the MIDI performance data, representative of the manual performance executed via the performance operation unit 4, into the newly created file as a set of music piece data of a music piece. In this manner, a data file having the file name with the character string "!song'nnn'" is newly stored into the folder in the storage device 10.

After storage into the storage device 10, the file name newly created by the aforementioned new file creation process, i.e. the automatically assigned file name, can be changed by the user into another name; after the name change, the corresponding file will be sorted on the basis of the changed file name. Arrangement may be made such that the predetermined mark "!" can not be put at the leading end of a file name when the file name is assigned by the user. With such an alternative arrangement, it is possible to avoid confusion between user-assigned file names and automatically assigned file names.

When a particular music piece data file stored in the storage device 10 is to be reproduced, the file name of the stored music piece data file is to be changed, or the stored music piece data file is to be re-edited, copied, deleted or the like, the user has to find the particular file from among a multiplicity of music piece data files stored in any one of a plurality of folders in the storage device 10.

Figure 4A:
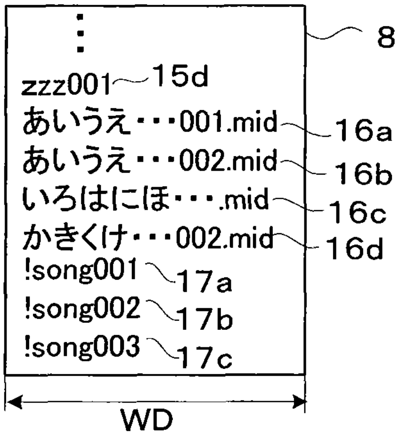
FIG. 4A is a diagram showing an example file name list displayed in the electronic music apparatus of FIG. 1.

In finding the desired file from among the files stored in the storage device 10, a file name list indicating all of the file names of a plurality of files, stored in any one of the folders in the storage device 10, is displayed on the display device 8 so that the desired file can be found from among the file names indicated or displayed in the list. FIG. 4A is a diagram showing an example display of the file name list indicating the file names illustratively shown in FIG. 2B. In FIG. 4A, the file names 16_a_-16_d_ are each displayed in a partly-omitted display style with part of the character string omitted from the list; this is because the file names 16_a_-16_d_ are too long to be displayed within the display area of the display device 8. As will be detailed below, the file list employed in the instant embodiment is characterized by a novel manner in which the character strings of the file names are displayed in the partly-omitted display style.

FIG. 5 is a flow chart showing an example operational sequence of the file name list display process. The file name list display process is performed for any one of a plurality of folders set in the storage device 10. First, at step S10, the user designates any one of the folders (directories), set in the storage device 10, for which the file name list display process is to be performed. For example, a list of options (e.g., icons of folders) for the user to select any one of the folders set in the storage device 10 may be displayed on the display device 8 to allow the user to designate, from among the displayed options, a particular folder for which the file name list display process is to be performed. Once the user designates such a folder for which the file name list display process is to be performed, a list of all of file names contained in the designated folder is acquired at step S11. Then, operations of steps S13-S19 to be described below are performed to determine a display style for all of the file names indicated in the acquired list. Step S12 is directed to a determination operation for performing the operations of steps S13-S19 for each individual file name contained in the acquired list.

First, at step S13, a display width WF necessary for displaying the file name is calculated. The necessary display width WF of the file name is a width of a display area, represented by the number of dots, which is necessary for displaying the entire character string constituting the file name. Let it be assumed here that a monospaced font (i.e., font of which a horizontal width is fixed per character) is used for each full-width character while a proportional font (i.e., font of which an optimal horizontal width is set per character) is used for a half-width character. Therefore, the necessary file name display width WF is determined by the number and types of characters in the character string constituting the file name.

Figure 4B:
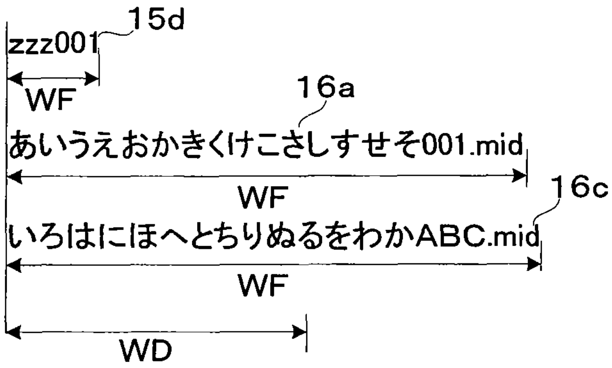
FIG. 4B is a diagram comparing a displayable width of a display device for displaying the file name list and necessary display widths of the file names.

At step S14, a comparison is made between the necessary file name display width WF calculated at step S13 and a file-name-displayable width (represented in the number of dots) WD of the display device 8. The operation of step S14 corresponds to a function of a comparison section. The file-name-displayable width WD is a width within which the file name list (see FIG. 4A) is displayable on the display device 8. As noted above, because the display device 8 is provided on the panel of the body of the electronic music apparatus, the screen size of the display device 8 is limited to a relatively small width, so that the file-name-displayable width WD of the display device 8 too has to be limited to a relatively small width. Consequently, in some cases, the necessary file name display width WF may exceed the file-name-displayable width WD. FIG. 4B shows, for the comparison purpose, the necessary display widths WF of the file names 15_d_, 16_a_ and 16_c_, illustrated in FIG. 2B, and the displayable width WD of the display device 8. As clearly seen from FIG. 4B, the necessary display width WF of long file names, such as the file names 16_a_ and 16_c_, exceeds the displayable width WD of the display device 18.

If the necessary file name display width WF is greater than the displayable width WD of the display device 8 (i.e., YES determination at step S15), control proceeds to step S16 in order to change the file name display style. Here, "changing the file name display style" means reducing the file name display width WF to appropriately fall within the displayable width WD of the display device 8 by omitting part of the character string constituting the file name. The instant embodiment employs a character string omission rule that is intended to omit part of the character string of the file name from the list with a leading end portion, later-described particular character string portion and extension of the file name left in the list. In the instant electronic music apparatus, for example, a table describing such a character string omission rule is provided in advance in the ROM 2 or RAM 3, and operations at and after step S16 are performed with reference to the table, namely, in accordance with the character string omission rule.

Note that, if the necessary file name display width WF is smaller than the file-name-displayable width WD of the display device 8 (NO determination at step S15), then the entire file name can be displayed in the file name list on the display device 8, and thus, an operation for changing the file name display style as described below need not be performed.

If, on the other hand, the necessary file name display width WF is greater than the displayable width WD of the display device 8, control proceeds to step S16 for detecting a particular character string portion from the character string constituting the file name. Namely, the operation of step S16 corresponds to a function of a determination section. Here, the "particular character string portion" to be detected is a character string portion predetermined as information necessary to identify the file in question. In the instant embodiment, the "particular character string portion" is the "three-digit numeral string", and, as noted above, the "three-digit numeral string" often functions as an important element for identifying the file in question.

For example, the file name 16*a* as shown in FIG. 4B, comprising a specific Japanese character string, is a file name of a type having a necessary display width WF greater than the displayable width WD and having the "particular character string portion" (i.e., three-digit numeral string) (YES determination at step S17). For such a file name, the file name display style is changed so that the display width WF falls within the displayable width WD with only a leading end portion, particular character string portion (three-digit numeral string "001") and extension ".mid" left in the list (step S18 of FIG. 5). More specifically, some characters immediately preceding (located to the left of) the three-digit numeral string are replaced with an omission mark (three-dot leader "•••"), so that the file name is displayed in a partly-omitted display style as shown in FIG. 4A. The character string range (number of characters) to be left as a leading end portion of the file name (in other words, character string range to be replaced with an omission mark) depends on a width necessary for displaying the particular character string portion (three-digit numeral string) "001" and extension ".mid" and displayable width WD. The operation of step S18 corresponds to a function of a display control section.

The file name 16*c* as shown in FIG. 4B, comprising another specific Japanese character string, is a file name of a type having a necessary display width WF greater than the displayable width WD and having no "particular character string portion" (i.e., three-digit numeral string) (NO determination at step S17). For such a file name, the file name display style is changed so that the display width WF falls within the displayable width WD with only a leading end portion and extension ".mid" left in the list (step S19 of FIG. 5). More specifically, some characters immediately preceding (i.e., located to the left of) the extension ".mid" are replaced with an omission mark, so that the file name is displayed in a partly-omitted display style as shown along with the reference number "16*c*" in FIG. 4A.

By the operations of steps S13-S19 being performed for each of the files contained in the designated folder, a suitable file name display style can be determined for each of the file names indicated in the file name list. Then, at step S20, the file name list having all of the files, contained in the folder, sorted by file name (in the predetermined file name order) is displayed on the display device 8. The user may select the sorting direction of the files between the ascending direction and the descending direction. One example of such a file name list to be displayed on the display device 8 at step S20 has been described above in relation to FIG. 4A. In the illustrated example of FIG. 4A, the file names 16*a*-16*d*, each having a necessary display width WF greater than the displayable width WD of the display device 8, are each displayed with part of the character string, constituting the file name, omitted through the operations of step S13-S19. Namely, each of the file names 16*a*, 16*b* and 16*d* is displayed with only the leading end portion, particular character string portion (three-digit numeral string) and extension ".mid" left in the list and hence with the other part omitted from the list. The file name 16*c* is displayed with only the leading end portion and extension ".mid" left in the list and hence with the other part omitted from the list. File names having a necessary display width WF smaller than the displayable width WD of the display device 8, such as the file names 15*d* and 17*a*-17*c*, are each displayed in its entirety. Further, to each file name that has a necessary display width WF greater than the displayable width WD of the display device 8 but has neither a particular character string portion (three-digit numeral string) nor an extension, there may be applied any suitable conventionally-known file name display style, such as the one where only a leading end portion of the file name is left in the list.

The file names 16*a* and 16*b*, for example, are determined such that they have the same or common Kana character string portion at their leading end and they are distinguishable from each other on the basis of the numeral strings following the Kana character string. This is a conventional naming pattern often used for files having records therein of different versions of a same music piece, in which case the two elements, i.e. leading Kana character string portion and trailing numeral string portion, function as primary elements for identifying each of the files in question (or distinguishing between the individual files), as noted earlier. Thus, by displaying, in the file name list, only the leading end portions, particular character string portions (three-digit numeral strings) and extensions ".mid" of the file names 16*a* and 16*b* with the other parts of the file names 16*a* and 16*b* omitted from the list, the user can reliably distinguish between the individual files even though the file names are displayed with parts of the respective character strings omitted from the list.

According to the sorting rule employed in the instant embodiment, as noted above, the exclamation mark "!" is a mark defined at the trailing end of the order relationship (ascending sorting order) of all of the characters usable as file names. Therefore, the file names 17*a*-17*c*, each of which is intended to be automatically assigned to a file to be newly created and has the exclamation mark "!", are located at trailing end positions in the file name list and clearly distinguishable from the other file names in the file name list. Further, of the file names having the exclamation mark "!", one file name whose "three-digit numeral string" represents the greatest number is located at the trailing end of the file name list. Thus, basically, the most-recently-created file is located at the lowest or near-lowest position of the file name list. In this way, the user can readily find each newly-created file from the file name list.

By automatically assigning a file name, having at its leading end a predetermined character defined at the trailing end of the order relationship (ascending sorting order) of all of the characters usable as file names according to the sort rule, the instant embodiment allows every automatically assigned file name to be located at or near the trailing end of the row of the files when the files stored in the storage device 10 have been sorted. Namely, when the files have been sorted, each file name automatically assigned to a newly created file can be clearly distinguished from the other file names. By thus automatically assigning a file name to each newly created file, the instant embodiment advantageously allows the user to readily find each file, having a file name automatically assigned through the automatic file name assigning function, from among a multiplicity of files stored in the storage device 10.

Further, when a file name list of files contained in a desired folder is to be displayed on the display device 8, and if a given one of the files has a necessary display with WF greater than the displayable width WD of the display device 8 and the file name has a particular character string portion (three-digit numeral string), the instant embodiment causes the character string of the file name to be indicated in the displayed list in a display style with only the particular character string portion (three-digit numeral string), leading end portion and extension of the file name left in the list and hence with the other part omitted from the list. Thus, even where character strings consisting two or more file name are displayed in the partly-omitted display style, the user can reliably distinguish between the individual data items (data files) on the basis of the character strings indicated in the list.

The instant embodiment has been described above as employing, as the predetermined character defined at the trailing end of the order relationship (ascending sorting order) of all of the characters usable as file names, the predetermined mark "!" that is to be put at the leading end of a file name through the automatic file name assigning function. Thus, in the descending sorting order, the predetermined mark "!" can be said to be a mark defined at the leading end of the order relationship of all of the characters usable as file names. Namely, when the files stored in the storage device 10 have been sorted in the descending order of the file names, a newly created file is necessarily located at or near the leading end of the row of the files. In this case too, the user is allowed to readily find the newly created file, having a file name automatically assigned through the automatic file name assigning function, from among the files stored in the storage device 10 because the automatically assigned file name of the newly created file can be clearly distinguished from the other file names.

Further, in the above-described embodiment, which employs the exclamation mark "!" as the predetermined character defined at the trailing end of the order relationship (ascending sorting order) of all of the characters usable as file names, the predetermined character to be put at the leading end of a file name, i.e. the character defined at the trailing end of the order relationship (ascending sorting order) of all of the characters usable as file names, differs depending on the sort rule applied to the file system. Furthermore, the character to be put at the leading end of the file name is not limited to the character defined at the trailing end of the ascending sorting order (and hence the leading end of the descending sorting order) and may be a character defined at the leading end of the ascending sorting order (and hence the trailing end of the descending sorting order). Furthermore, the user may be allowed to select as desired which one of the characters at the trailing and leading end positions of the ascending sorting order should be used.

Whereas the preferred embodiment has been described above in relation to the case where the automatic file name assigning function is activated at the time of creation of a new file, the present invention is not so limited. For example, when a copied-to (copy destination) file is newly created by copying a copied-from or copy source file stored in the storage device 10, the present invention may be applied to automatically assign a file name, having a predetermined character (e.g., exclamation mark "!" as in the above-described embodiment), to the copied-to file to be newly created. The file name to be automatically assigned in this case may be constructed in any one of the following manners. Assuming that the file name of the copied-from file is "abc002", the copied-to file may be assigned a file name "!abc003" which is created by adding the predetermined character (exclamation mark "!") to the leading end of the copied-from file's name "abc002" and incrementing by one the trailing-end number "002" of the copied-from file's name. As another example, the copied-to file may be assigned a file name "!abc002-001" which is created by adding the predetermined character (exclamation mark "!") to the leading end of the copied-from file's name "abc002" and newly adding a "three-digit numeral string" to the trailing end of the name "abc002" with the hyphen mark "-" put therebetween. In any case, the newly created file can be located at the trailing end or leading end position of the sorting order by the "predetermined character" being put at the leading end of the file name, and relationship between the copied-from file and the copied-to file can be identified by the file name of the copied-from file being left in the file name of the newly created file.

Alternatively, the predetermined character to be added to the leading end of the automatically assigned name may be made different between the time when a file is to be newly created (i.e., new data are to be recorded into a file) and the time when an existing file is to be copied.

Furthermore, whereas the preferred embodiment has been described above in relation to the case where a file name is automatically assigned to a file to be newly created, the present invention is not so limited; for example, the present invention may be applied when a folder name is automatically assigned to a folder to be newly created.

Furthermore, the object to be assigned a file name through the automatic file name assigning function of the present invention is not limited to a data file of MIDI performance data and may be a data file of music piece data of another format, such as audio data. Moreover, the present invention may be applied when a data file of other data than music piece data or a folder storing such a data file is to be created, to automatically assign a name to the file or folder.

Further, whereas the preferred embodiment has been described above in relation to the case where a "three-digit numeral string" is detected as a particular character string portion of a file name at step S16 of FIG. 5, the particular character string portion to be detected at step S16 is not limited to such a "three-digit numeral string" and may be another particular character string portion than a "three-digit numeral string" as long as the file in question can be identified or distinguished on the basis of the character string portion. For example, the particular character string portion may be a word having a specific meaning, alphabetical letter string indicative of a MIDI tone generator format suited for reproduction of a music piece data file (e.g., "GM" indicative of the GM standard or "XG" indicative of the XG standard), or the like. In an alternative, a desired "particular character string portion" may be set by the user, in which case the user may designate a desired particular character string portion or select a desired particular character string portion from among a plurality of candidate character string portions. Whereas the preferred embodiment has been described above as detecting just one three-digit numeral string as the desired particular character string portion, a plurality of particular character string portions may be set as the object of detection at step S16.

Furthermore, whereas the rule for omitting part of a character string constituting a file name has been described above as omitting part of the file name with a leading end portion, particular character string portion and extension of the file name left, it may omit part of the file name with only the leading end portion left undeleted.

Furthermore, the preferred embodiment has been described above in relation to the case where a character string portion immediately before (located to the left of) a particular character string portion (three-digit character string "001") is processed at step S18 of FIG. 5; this is because an extension or character string portion that should be left undeleted is located behind (to the right of) the particular character string portion. In some cases, the position where the particular character string portion (three-digit character string) that should be left undeleted in the partly-omitted display is to be inserted may be at the leading end of the file name rather than immediately before the extension, or other character string portions may be located before and behind the particular character string portion. In such cases, display of either only the character string portion before the particular character string portion or both of the other character string portions located before and behind the particular character string portion are omitted at step S18 of FIG. 5.

Furthermore, whereas the file name list has been described above as a list of music piece data (MIDI performance data) files, the present invention is not so limited. For example, the file name list may be a list of music piece data files of another format, such as audio data files, or a list of other data files or data items than music piece data files, such as accompaniment style data files to be used for an automatic accompaniment function of the electronic musical instrument, tone color data files indicative of tone colors of tones to be generated by the electronic musical instrument, or animation data files for reproduction of animations, in which case too the file names can be displayed in a partly-omitted display style where part of the character strings constituting the file names is omitted.

Furthermore, the electronic music apparatus to which the present invention is applied may be an electronic musical instrument of any conventionally-known type as along as it has a mechanism for storing data files into the storage device. Moreover, the present invention may be applied to any other devices and apparatus than electronic musical instruments that execute a music performance electronically, such as a music reproduction (playback) apparatus for reproducing audio files stored in the storage device and information processing apparatus (e.g., personal computers) equipped with a music performance or music reproduction function.

This application is based on, and claims priority to, JP PA 2007-135331 filed on 22 May 2007 and JP PA 2007-135332 filed on 22 May 2007. The disclosure of the priority applications, in its entirety, including the drawings, claims, and the specification thereof, is incorporated herein by reference.

What is claimed is:

1. A file or folder management apparatus comprising:

a storage section that stores one or more files for storing data sets and one or more folders for collectively holding the files, each of the files and folders having a name assigned thereto;

a sort section that sorts the files or folders, stored in said storage section, in a predetermined order based on the names of the files or folders in accordance with a sort rule, the sort rule defining an order relationship among all characters usable as the names of the files and folders;

a creation section that newly creates a file or folder in said storage section; and a name assigning section that automatically generates and assigns a name to the newly created file or folder, the name beginning with a character that is defined at a leading or trailing end in the predetermined order among all characters usable as the names of the files and folders, wherein each character of each of the names of each of the one or more files and one or more folders stored by the storage section is assignable as any of the characters defined by the sort rule.

2. A file or folder management apparatus according to claim 1, wherein the name assigning section automatically generates the name of the newly created file or folder to contain a character or characters that cause(s) the newly created file or folder to be located first or last in a leading or trailing end portion of the predetermined order, as sorted by the sort section in accordance with the sort rule.

3. A file or folder management apparatus according to claim 1, wherein the character that begins the name of the newly created file or folder is a non-alphanumeric character.

4. A non-transitory computer-readable storage medium containing a program for causing at least a computer to perform a procedure for managing files and folders stored in a memory, said memory storing one or more files for storing data sets and one or more folders for collectively holding the files, each of the files and folders having a name assigned thereto, said procedure comprising:

a step of sorting the files or folders, stored in said memory, in a predetermined order based on the names of the files or folders in accordance with a sort rule, the sort rule defining an order relationship among all characters usable as the names of the files and folders;

a step of newly creating a file or folder in said memory; and a step of automatically generating and assigning a name to the newly created file or folder, the name beginning with a character that is defined at a leading or trailing end in the predetermined order among all characters usable as the names of the files and folders, wherein each character of each of the names of each of the one or more files and one or more folders stored in said memory is assignable as any of the characters defined by the sort rule.

5. A non-transitory computer-readable storage medium according to claim 4, wherein the name assigning step includes automatically generating the name of the newly created file or folder to contain a character or characters that cause(s) the newly created file or folder to be located first or last in a leading or trailing end portion of the predetermined order, as sorted by the sort section in accordance with the sort rule.

6. A non-transitory computer-readable storage medium according to claim 4, wherein the character that begins the name of the newly created file or folder is a non-alphanumeric character.

7. A computer-implemented method for managing files and folders stored in a memory, said memory storing one or more files for storing data sets and one or more folders for collectively holding the files, each of the files and folders having a name assigned thereto, said method comprising:

a step of sorting the files or folders, stored in said memory, in a predetermined order based on the names of the files or folders in accordance with a sort rule, the sort rule defining an order relationship among all characters usable as the names of the files and folders;

a step of newly creating a file or folder in said memory; and a step of automatically generating and assigning a name to the newly created file or folder, the name beginning with a character that is defined at a leading or trailing end in the predetermined order among all characters usable as the names of the files and folders, wherein each character of each of the names of each of the one or more files and one or more folders stored in said memory is assignable as any of the characters defined by the sort rule.

8. A computer-implemented method according to claim 7, wherein the name assigning step includes automatically generating the name of the newly created file or folder to contain a character or characters that cause(s) the newly created file or folder to be located first or last in a leading or trailing end portion of the predetermined order, as sorted by the sort section in accordance with the sort rule.

9. A computer-implemented method according to claim 7, wherein the character that begins the name of the newly created file or folder is a non-alphanumeric character.

* * * * *